United States Patent Office 2,872,319
Patented Feb. 3, 1959

2,872,319

PREPARATION OF MIXTURES OF AMINO ACIDS

Karl Arvid Johannes Wretlind, Stockholm, Sweden

No Drawing. Application September 6, 1957
Serial No. 682,297

Claims priority, application Sweden September 10, 1956

1 Claim. (Cl. 99—14)

This invention relates to the preparation of mixtures of amino acids such as are suitable for administration to man as nutrient materials.

During the last few years amino acids have come increasingly into therapeutic use. Amino acids have been administered clinically substantially in the form of preparations containing all of the essential amino acids. Amino acid preparations are of particular use when enteral or peroral administration is for some reason excluded, the amino acids then being administered parenterally. Body protein can be synthesized if amino acids are injected parenterally, which is similar to the normal process, with however the difference that the amino acids in the former case penetrate into the blood from the intestinal track and in the latter case are administered directly intravenously.

Different types of amino acids are used therapeutically. A mixture of pure amino acids may be used but the isolation of the individual pure amino acids is so costly that the use of this type of preparations has been very limited. Usually amino acid preparations are used which are obtained by hydrolysis of proteins such as casein. The hydrolysis may be carried out by means of mineral acids or enzymes. Free amino acids are obtained by acid hydrolysis but the method has disadvantages since the vitally important or essential amino acid, tryptophane, is destroyed, and has therefore to be added to the hydrolysate, and the growth factor, strepogenin, is destroyed. Moreover, it is technically very difficult to remove from the product the acid used for the hydrolysis.

Enzymic hydrolysis is therefore more preferably used and yields a preparation containing free amino acids and in addition always a certain amount of peptides, due to the fact that enzymic hydrolysis is not quite so complete as acid hydrolysis. No amino acids are destroyed during the enzymic hydrolysis and the growth factor, strepogenin, is preserved intact. Several different types of amino acid preparations, manufactured by enzymic hydrolysis, are available. The most important difference between them is the degree of hydrolysis, i. e. the contents of free amino acids in the preparation. Several amino acid preparations contain less than 50% amino acids in the free form, the main part of the amino acids being present in the form of peptides. Among the available amino acid preparations containing more than 50% of the amino acids in the free form there are certain differences with respect to the contents of free amino acids as well as with respect to the degree of purification. Certain enzymic casein hydrolysates are used without further purification. In other cases amino acid preparations prepared by enzymic hydrolysis have been subjected to a dialysis for the removal of undesirable high molecular constituents. This removal of high molecular pyrogenous substances, non-digested protein and high molecular peptides, which may cause allergic or anaphylatic reactions, has been shown to be of importance for reducing the high frequency of side reactions.

It has been observed that when a solution of amino acids and peptides, prepared from commercial proteins, such as casein, is heated, the solution darkens in color and it appears that certain vitally important amino acids, such as tryptophane are destroyed. It has been found that this darkening in color and destruction of valuable amino acid may be eliminated or substantially reduced by using a special purifying method for the proteins used as starting materials.

According to the present invention therefore a process for the production of a mixture of amino acids suitable for use as nutrient material comprises subjecting crude protein to preliminary purification to remove therefrom the fats, carbohydrates and other contaminants, the product is subjected to enzymic hydrolysis and the amino acid mixture thus obtained is then subjected to dialysis at elevated temperature. The dialysis may be carried out between 70° C. and the boiling point of the medium, e. g. 82–90° C., but can also be carried out at a lower temperature.

The following examples will serve to illustrate the invention:

Example I

To 1000 litres of skimmed milk 10 N hydrochloric acid is added until a pH value of 4.7 is obtained. The precipitate obtained is filtered off and is washed with 400 litres of distilled water. The impure casein is then dissolved in 1000 litres of distilled water by adding 10 N sodium hydroxide until a pH value of 8 is obtained. After filtering, the casein is precipitated again with hydrochloric acid as above, and the precipitate filtered off is washed with 400 litres of distilled water. These dissolving and precipitating operations are repeated twice more. In order to obtain a good result these operations must be carried out under aseptic conditions. The wet precipitate of casein is then washed three times with absolute ethyl alcohol in quantities of 200 litres. Thereafter the casein is extracted by boiling in 200 litres of absolute ethyl alcohol. After filtering, the procedure is repeated twice more. When the preparation has been dried, an extraction with boiling diethyl ether in quantities of 150 litres is carried out. After filtering, the extraction with diethyl ether is repeated twice more. A casein is thus obtained which is free from carbohydrates and fats and which is suitable for the manufacture of the said amino acid preparations. The enzymic preparations to be used for the enzymic hydrolysis are purified by precipitation with acetone.

The hydrolysis and dialysis are effected in the following manner: 50 kg. of purified casein are added to 1000 litres of distilled water and 10 N sodium hydroxide is added in such a quantity that a pH value of 7–8.5 is reached, 0.3 kg. of pancreas powder treated with acetone and 0.1 kg. of a polypeptidase preparation of the mucous membrane of the intestine, precipitated with acetone, are then added. Toluene is used as preservative. The mixture is allowed to stand at 37° C. until no further increase of the amino nitrogen is obtained. The solution is concentrated to about 200 litres and is subjected to a dialysis through a semi-permeable membrane, such as a regenerated cellulose membrane, against distilled water at a temperature between 70° C. and the boiling point, preferably at 82–90° C. The dialysate is diluted to a suitable concentration and is filtered under sterile conditions. After biologic testing the amino acid preparation obtained may be used for intravenous nutrient administration in man.

Example II 500 litres of blood serum or blood plasma are diluted with an equal volume of water, and acetic acid is added to a pH value of 5. The solution is heated with stirring to 80° C. The protein precipitated is filtered off and is washed with large volumes of distilled water having a temperature of 50° C. Each washing operation is effected by suspending the protein in four volumes of distilled water. The temperature is maintained at 50° C. with stirring for two hours. After filtering, the precipitate is dissolved with sodium hydroxide as described in Example 1 and then the precipitation and washing procedure is repeated five times. Extraction with alcohol and diethyl ether is then effected as in Example I. The hydrolysis and dialysis are then carried out as in Example I.

What I claim is:

A process for preparing amino acid mixtures suitable for use as a nutrient material comprising repeatedly dissolving crude protein in aqueous alkali solution followed by repeated precipitation from the alkali solution with acid, thereafter treating the precipitate with ethyl alcohol and diethyl ether, whereby the purified protein obtained as a result of the foregoing steps is substantially free from fats, carbohydrates and other contaminants, subjecting the purified protein to enzymic hydrolysis and subjecting the hydrolysate to dialysis at a temperature of 82–90° C.

References Cited in the file of this patent

UNITED STATES PATENTS

| | | |
|---|---|---|
| 2,364,008 | Stuart | Nov. 28, 1944 |
| 2,433,879 | Wretlind | Jan. 6, 1948 |
| 2,454,915 | Fevold et al. | Nov. 30, 1948 |
| 2,473,255 | Parfentjev | June 14, 1949 |